United States Patent [19]

Cummins

[11] Patent Number: 5,731,022

[45] Date of Patent: Mar. 24, 1998

[54] METHOD AND APPARATUS FOR DISPENSING BAKERY DOUGH

[75] Inventor: Donald L. Cummins, deceased, late of Mechanicsville, Va., by Marian G. Cummins, executor

[73] Assignee: Cummins Eagle, Inc., Ashland, Va.

[21] Appl. No.: 644,107

[22] Filed: May 10, 1996

Related U.S. Application Data

[63] Continuation-in-part of Ser. No. 516,431, Aug. 17, 1995, Pat. No. 5,516,272, which is a continuation-in-part of Ser. No. 297,123, Aug. 29, 1994, Pat. No. 5,443,854.

[51] Int. Cl.$^6$ .................. A21C 1/00; A21D 6/00
[52] U.S. Cl. .................. 426/231; 222/55; 222/63; 425/145; 425/149; 425/382.4; 426/516
[58] Field of Search .................. 426/231, 516; 425/149, 145, 382.4; 222/55, 63, 1, 412

[56] References Cited

U.S. PATENT DOCUMENTS 4,667,852 5/1987 Siemann .................. 222/55

Primary Examiner—George Yeung
Attorney, Agent, or Firm—Norman B. Rainer

[57] ABSTRACT

Dough intended for use in producing bakery products is homogenized and advanced to extrusion nozzles where it is cut into successive pieces that fall onto a moving conveyor. The pieces are of precisely uniform weight because a constant pressure is maintained on the dough as it is forwarded by a metering pump toward the nozzles. Apparatus for achieving such result includes an auger, a developer positioned downstream from the auger, and a transition chamber fed by the developer and located upstream from the metering pump. A pressure-measuring monitor serves to control the rotational speed of the auger, thereby maintaining the dough under constant pressure within the apparatus.

37 Claims, 4 Drawing Sheets

METHOD AND APPARATUS FOR DISPENSING BAKERY DOUGH

RELATED APPLICATIONS

This Application is a continuation-in-part of U.S. patent application Ser. No. 08/516,431, filed Aug. 17, 1995, now U.S. Pat. No. 5,516,272, which is a continuation-in-part of U.S. patent application Ser. No. 08/297,123, filed Aug. 29, 1994, now U.S. Pat. No. 5,443,854.

BACKGROUND OF THE INVENTION

1. Field of the Invention

This invention relates to the handling of dough for baking, and more particularly concerns a method and apparatus for dispensing successive pieces of dough of constant weight.

2. Description of the Prior Art

Methods and apparatus for pumping, homogenizing and dividing dough into pieces of predetermined uniform weight for baking into bread loaves, buns, rolls and the like are disclosed in U.S. Pat. Nos. 4,960,601; 4,517,212; 4,449,908; 4,424,236; and 4,332,538. In general, such apparatus includes a hopper which receives dough, auger means for advancing the dough, metering means which control the advance of the dough, multiple nozzles which receive the metered dough, and cutting means which sever the continuously advancing dough into discrete pieces which fall onto an underlying moving belt. A homogenizing step is usually included, which may be accomplished by mixing means generally referred to as a "developer".

It is very important that each dough piece be as equal in weight to each other as possible. The uniformity of weight not only produces products of uniform quality but facilitates the automated handling and packaging of the baked products. Also, the weight of the dough is one of the most expensive cost elements in manufacturing baked goods, and control of the weight tolerances can reduce the need for excess dough. The production of dough pieces of a given weight is known as scaling in the trade. In general, less than 2% deviation in weight is sought relative to a target weight.

Metering means such as cylinder-housed pistons have been employed to achieve improved scaling. However such devices require use of mineral oil which escapes as an undesirable atomized vapor of concern as a health hazard. Such devices also produce an undesirable high noise level. Although metering means, such as a positive displacement pump, has been employed to achieve uniform scaling, inaccuracies are experienced. This results from the fact that the metering pump dispenses a constant volume, but the dough has a non-uniform density because of gas formation produced by the yeast content of the dough. Prior efforts to achieve greater uniformity of dough density have included degassing techniques and pressurization of the dough upstream of the volumetric metering means.

It has been found however, that dough can degrade in the dough-handling apparatus, the degree of degradation being increased by factors such as high pressure, the time duration of said pressure, and shearing forces at the surfaces of passages through which the dough travels. The degradation becomes apparent in the finished product in the form of swirl patterns and non-uniformity of texture along with discoloration and circular stratiform.

Equipment for processing the dough has generally involved hydraulically driven motors. Such motors permit leakage of hydraulic fluid onto the surfaces that contact the dough, and further produce high noise levels.

It is accordingly an object of the present invention to provide apparatus for pumping, homogenizing and dividing dough into successive pieces of uniform weight.

It is another object of this invention to provide apparatus as in the foregoing object which produces minimal degradation of the dough.

It is another object of the present invention to provide apparatus of the aforesaid nature having few moving components.

It is a still further object of this invention to provide apparatus of the aforesaid nature which can be easily dismantled to facilitate cleaning and repair.

It is yet another object of this present invention to provide a method, achievable by the aforesaid apparatus, for dispensing successive pieces of dough of uniform weight.

These objects and other objects and advantages of the invention will be apparent from the following description.

SUMMARY OF THE INVENTION

The above and other beneficial objects and advantages are accomplished in accordance with the present invention by a method of moving and treating dough comprising the steps of:

a) entering dough into an auger that pressurizes and imparts downstream impetus to the dough.

b) entering the pressurized dough into a confining region having an upstream zone which establishes a first operating dough pressure, and a downstream zone which establishes a second operating dough pressure.

c) advancing the pressurized dough from said upstream zone to said downstream zone by a positive displacement metering device, and d) permitting controlled emergence of the dough from the downstream zone of said confining region.

In preferred embodiments, the hydraulic pressure of the dough in the confining region is continuously sensed, and the rotational speed of the auger is varied responsive to the sensed pressure, thereby controlling the pressure in said confining region. A developer may be interposed between the auger and metering device within the confining region, in which case the pressure is preferably sensed between the developer and metering device. The controlled emergence of the dough from the confining region is preferably accomplished by a device which resiliently resists movement of the dough through an outlet orifice, thereby dampening excursions of pressure from a sought pressure within said confining region.

The present invention further encompasses apparatus for treating and dispensing dough, said apparatus comprising:

a) an auger for pressurizing dough received at atmospheric pressure to a first operating pressure above atmospheric pressure, and for simultaneously imparting a downstream impetus to the pressurized dough, b) confinement means for receiving the pressurized dough and directing downstream transport of the dough under the impetus of said auger, c) means for metering said pressurized dough within said confinement means and advancing the dough in a downstream direction, and d) outlet means for dispensing the dough from said confinement means.

In preferred embodiments of the apparatus, a developer is disposed within the confinement means between the auger and metering means. A sensor downstream of the auger senses pressure, and is interactive with means for varying the rotational speed of the auger responsive to the sensed pressure, thereby controlling the pressure within said confinement means. The outlet means preferably includes a nozzle for receiving dough from the metering means. Between the metering means and the nozzle, there is preferably interposed means for resiliently resisting the downstream passage of dough toward said nozzle, thereby dampening excursions of pressure within the confinement means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figures 1, 2:
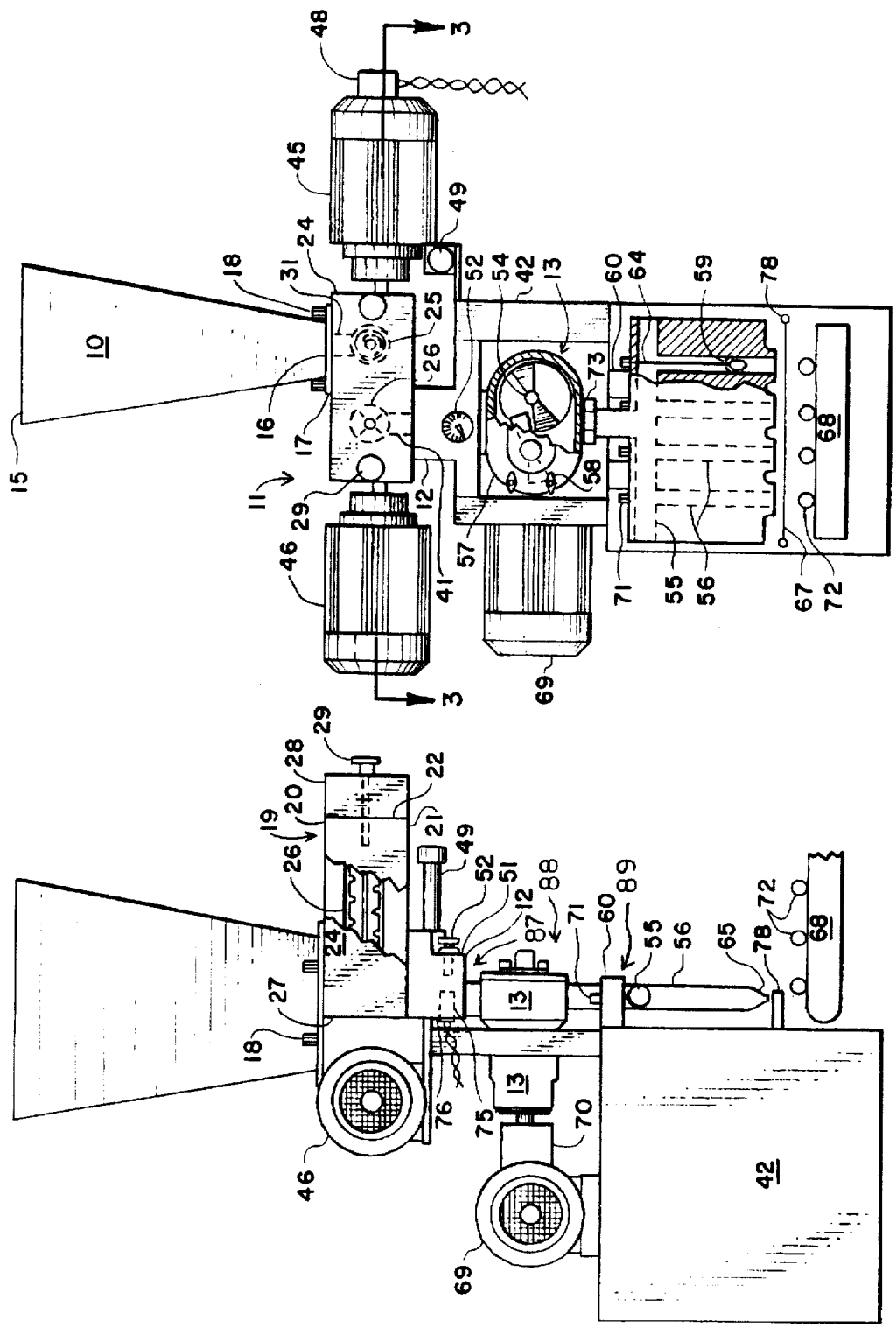
FIG. 1 is a front view of an embodiment of the apparatus of the present invention, with portions broken away to reveal internal details.
FIG. 2 is a side view of the embodiment of FIG. 1 with portions broken away.

Referring to FIGS. 1–5, an embodiment of dough treating and dispensing apparatus of the present invention is shown comprised of hopper 10 disposed above advancing assembly 11 which is positioned above transition housing 12, metering pump 13 and extrusion conduits 56. An outer framework 42 provides support for said components.

Hopper 10 is of integral construction and tapered downwardly from upper extremity 15 to lowermost exit extremity 16. The hopper is contoured so as to have no corners where dough might accumulate as a stagnant zone. Exit extremity 16 is equipped with an outwardly directed flange 17 which permits sealed joinder to advancing assembly 11 using bolts 18. A resilient gasket or O-ring, or equivalent means may be employed to assure pressure-tight joinder of the hopper to the advancing assembly.

Figure 3:
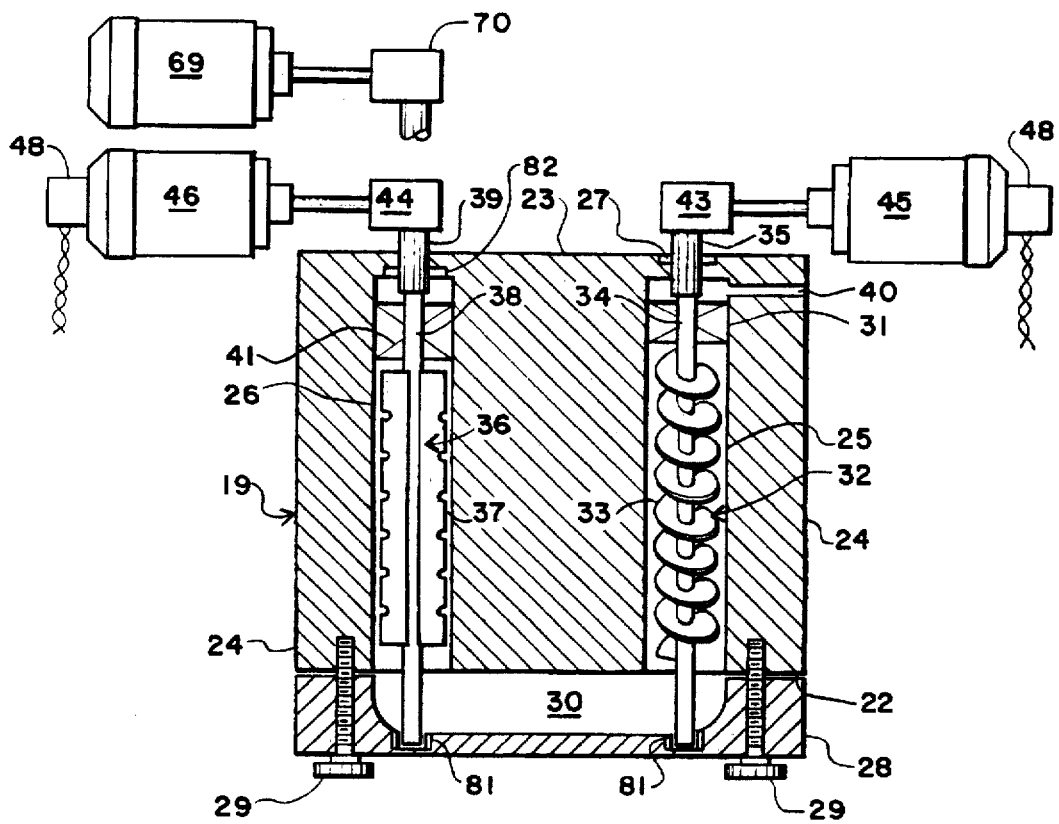
FIG. 3 is an enlarged sectional view taken in the direction of the arrows upon the line 3—3 of FIG. 1.
Figure 3A:
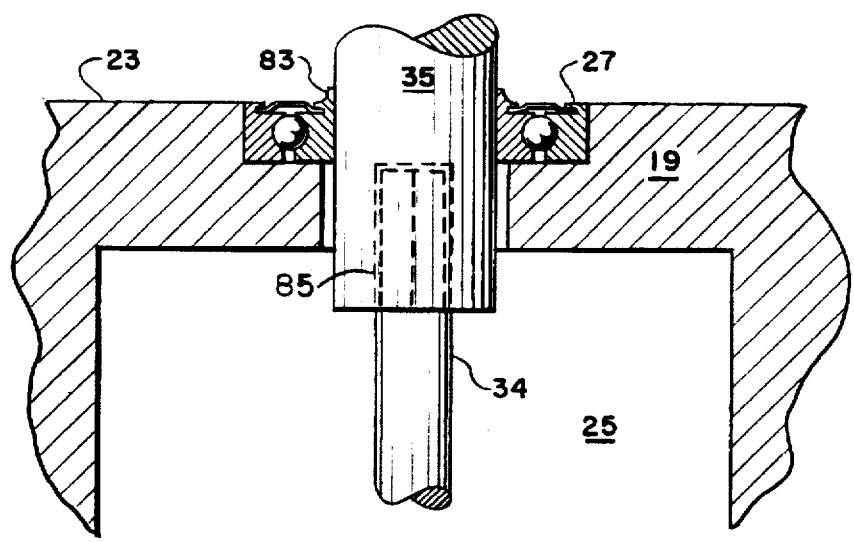
FIGS. 3a and 3b are enlarged fragmentary views of FIG. 3.
Figure 3B:
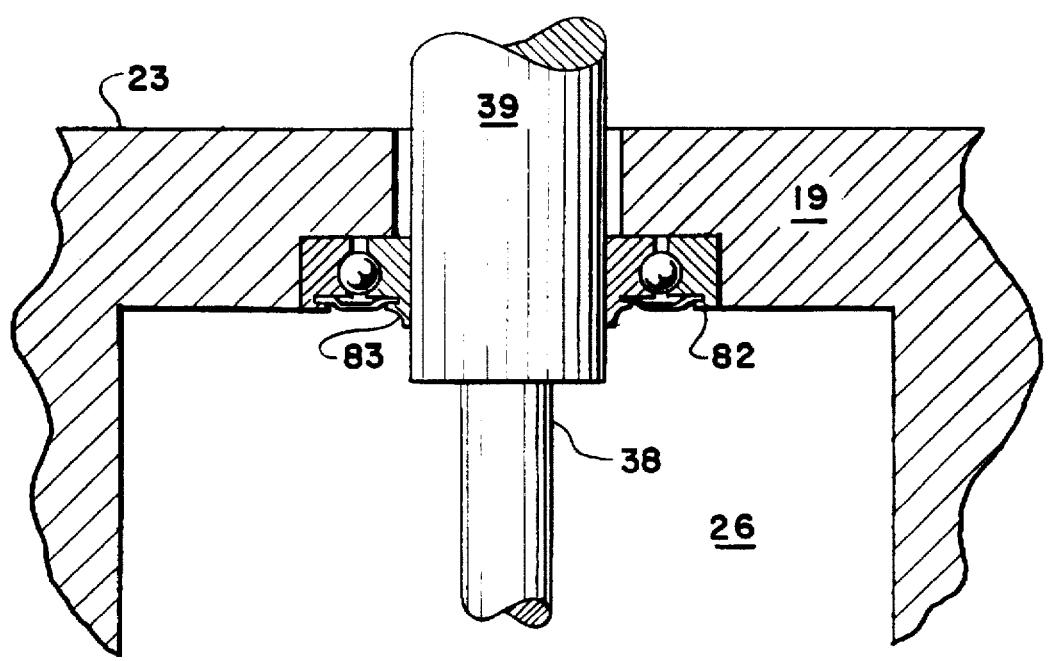

As shown in FIGS. 1, 2, and 3, advancing assembly 11 is comprised in part of receiver block 19 of generally rectangular configuration bounded by flat upper and lower surfaces 20 and 21, respectively, flat front and rear surfaces 22 and 23, respectively, and opposed side surfaces 24. First and second circular cylindrical bores 25 and 26, respectively, extend in parallel disposition between said front and rear surfaces. As shown in FIGS. 3a and 3b, sealing bushings 27 and 82, associated with bores 25 and 26, respectively, are associated with rear surface 23.

It is to be noted that bushing 27 contains an outwardly directed wiper lip 83 adapted to prevent fluid flow into bore 25 whereas bushing 82 contains an inwardly directed wiper lip 84 adapted to prevent fluid flow out of bore 26.

A coupling block 28 is removably associated with front surface 22 by bolts 29, and has a passage 30 configured to establish continuity between the front extremities of both bores. A receiving port 31 penetrates upper surface 20 and establishes communication between exit extremity 16 of the hopper and first bore 25. An auger 32 is housed within said first bore, said auger being comprised of a continuous vane 33 that extends to a radial clearance of 0.020–0.040 inch with respect to said bore, and centered shaft 34 that extends rearwardly to socketed engagement with receiver shaft 35 secured by bushing 27. To achieve said socketed engagement, the rearward extremity of the centered shaft is of a square contour, matching the contour of pocket 85 of said receiver shaft. The forward extremity of shaft 34 is rotatively supported by bearing boss 81 held by coupling block 28. By virtue of such manner of construction, auger 32 can be easily pulled out of bore 25 to facilitate cleaning. A degassing port 40 extends through block 19 into said first bore at a site rearwardly of vane 33, and communicates with a vacuum source, not shown. Bushing 27 prevents air from being drawn into bore 25 in response to the vacuum applied to receiving port 31.

A developer unit 36 is disposed within said second bore, said developer comprised of a plurality of blades 37 equiangularly disposed about shaft 38 that extends rearwardly to socketed engagement with receiver shaft 39 secured by bushing 82. The blades are radially spaced about 1/16" from the bore. The forward extremity of shaft 38 is rotatively supported by bearing boss 81 held by coupling block 28. The developer unit 36, like the auger, can accordingly be pulled out of its bore to facilitate cleaning. The developer may alternatively be of paddle or ribbon design. An exit port 41 extends between the rear extremity of the second bore and lower surface 21. Receiver block 19 and coupling block 28 are preferably fabricated of engineering grade plastic having a low coefficient of surface friction. Suitable plastics include ultra-high molecular weight polyolefin, polyacetal, polyester, polyamide, and other moldable plastics having equivalent properties.

The rear extremities of receiver shafts 35 and 39 extend to right angle drive units 43 and 44, respectively, which are driven by inverter-controlled variable speed electric motors 45 and 46, respectively. The auger and developer are preferably adapted to rotate in opposite directions. A separate inverter electrical speed controller 48 is associated with each motor 46 and 45. Inverter 48, of standard construction, is designed to receive a control signal which is utilized to control the voltage and frequency of current which powers the respective motor. A suitable inverter controller is the Movitrac model G-2 made by the Toshiba Company. Both motors may be identical, having a horsepower rating in the range of 3 to 7 HP. The auger is typically rotated at speeds in the range of 50–250 rpm. The developer is typically rotated at speeds in the range of 50–300 rpm. The entire advancing assembly may be constructed so that it may be pivoted upward about pivot rod 49 attached to frame 42 in parallel relationship to end surface 24 adjacent motor 45. Pivoted lifting of the advancing assembly facilitates cleaning and repair. Suitable means may be provided to secure the head assembly in its upper, cleaning position, and in its lowermost, functional position.

Transition housing 12 is disposed below lower surface 21 of said head assembly and configured to establish pressure-tight connection with exit port 41. The front surface 51 of housing 12 secures a pressure indicating device 52 which senses and indicates the hydraulic pressure within housing 12. An electronic pressure-sensing transducer 75 inserted through rear surface 76 of housing 12 produces an electrical control signal which is fed to inverter 48. By virtue of such arrangement, the speed of auger 32 is controlled. Because the route taken by the rotational speed of the auger produces increased pressure on the dough at transducer 75. In general, the configuration of the apparatus and its operating parameters are such that a constant pressure in the range of 15–28 psig is maintained at transducer 76.

A rotary positive displacement metering pump 13 is joined in a pressure-tight manner to the underside of housing 12, and receives dough therefrom. A suitable metering pump is Model 34 made by the Waukesha Company of Delavan, Wis. Said pump is driven by inverter controlled variable speed motor 69, acting through a right angle coupling 70, and is characterized in having two dual lobe intersecting rotors 54. A face plate 57 held by bolts 58 can be removed to facilitate removal of the rotors and cleaning of the interior of the pump.

The role of metering pump 13 is to accurately advance pressurized dough in a downstream direction while maintaining the upstream pressure of the dough. In fact, the portion of the apparatus between the auger and metering pump 13 is considered an upstream zone 87 of a large confining region 88 which encompasses dough-contacting portions of the apparatus including the upstream zone and downstream portions. The hydraulic pressure of the dough in said upstream zone may be considered a first operating pressure, which, as already mentioned, will be in the range of 15–28 psig. The hydraulic pressure of the dough in the portion of the apparatus downstream from the metering pump will be lower, as will be discussed hereinafter.

A horizontally disposed distribution manifold 55 is positioned below said pump and coupled thereto in pressure-tight but removable joinder by means of threaded fitting 73.

A plurality of parallel extrusion conduits 56 are downwardly directed from said manifold. Said distribution manifold and extrusion conduits 56 are exemplified as being fashioned from a single block 79 of engineering grade plastic. Each conduit contains a pressure drop regulator assembly 59, as best shown in FIG. 4, comprising a control stem 64 which extends upwardly through manifold 55 to the top of block 79 where it is threadably secured at a desired elevation by means of threaded control knob 71.

A conically tapered plug 61 is disposed upon the lowermost extremity of each control stem, and adapted to abut upwardly with a conically tapered shoulder 62 within conduit 56. Resilient resistive means such as coil spring 63 is interposed between the lowermost extremity of stem 64 and plug 61. By virtue of such arrangement, upward movement of stem 64 constricts conduit 56, thereby increasing the upstream pressure of the dough and thereby dampening excursions of pressure from the sought operating pressure upstream of plug 61.

Plug 61 defines the downstream extremity of confining region 88 whose upstream extremity is defined by the auger. Within said confining region, upstream zone 87 is defined by dough-contacting portions between the auger and the inlet of the metering pump; and a downstream zone 89 is defined by dough-contacting portions between the outlet of the metering pump and plug 61. The pressure of the dough within said upstream zone is considered a first operational pressure. The pressure of the dough within said downstream zone is considered a second operational pressure. Said second operational pressure, controlled in part by resistive means 63, is preferably 20% to 50% lower than said first operational pressure.

Figure 4:
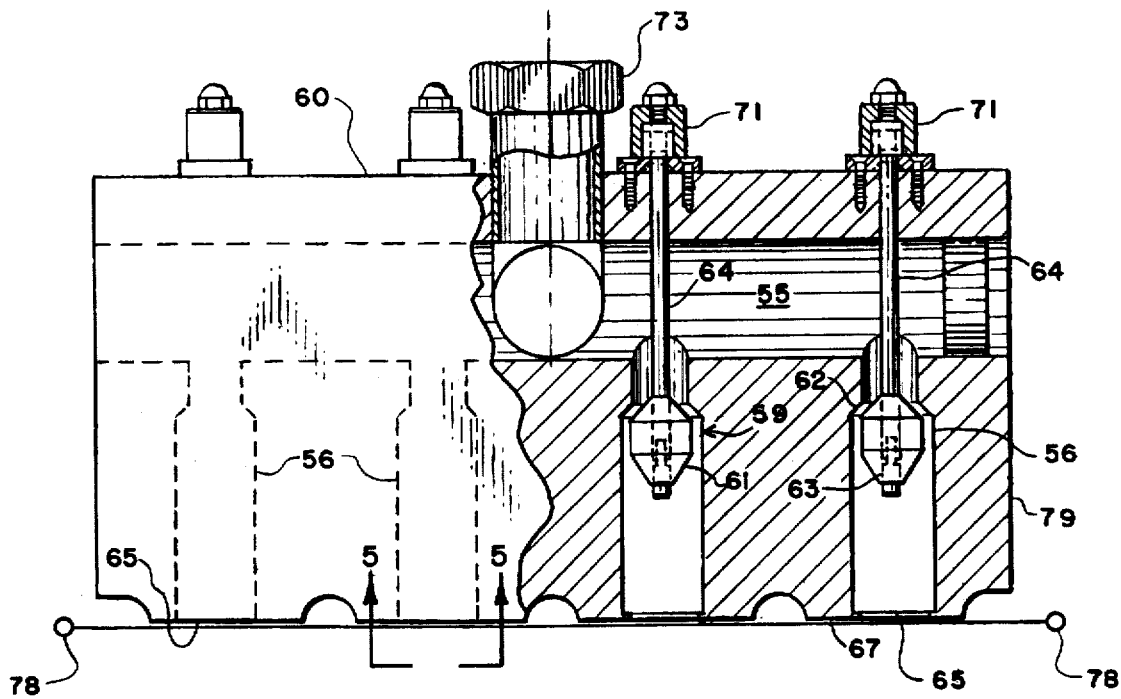
FIG. 4 is an enlarged fragmentary front view of the embodiment as shown in FIG. 1.
Figure 5:
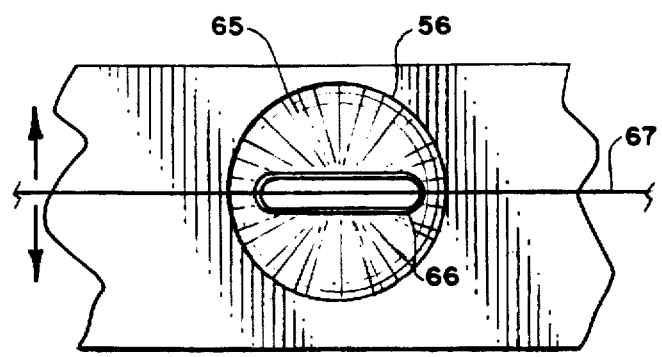
FIG. 5 is an enlarged fragmentary bottom view taken in the direction of the arrows upon the line 5—5 of FIG. 4.

The lowermost extremity of each conduit has a tapered extrusion nozzle 65, as best shown in FIGS. 4 and 5, having an orifice 66 that is elongated in the same direction as manifold 55. A cutting wire 67 mounted upon opposed support posts 78 is disposed below said nozzles, and is adapted to pass back and forth over said orifices in sliding contact therewith to produce pieces of dough 72. The motion of the wire is transverse to the direction of elongation of the orifice. Such combination of elongated orifice and transverse cutting direction has been found to provide a faster cutting action. The wire is further caused to ride along the tapered sides of the nozzle before crossing the orifice. The sequentially severed pieces of dough fall onto a moving belt 68 of conventional design, which carries the pieces of dough to further downstream processing prior to baking. The aforementioned specialized configuration of nozzle and associated cutting wire reduces dwell time during cutting, thereby enhancing weight uniformity and producing more accurate positioning of the pieces of dough upon the belt. Positioning of the pieces is very important in order to assure that the pieces are timed accurately for handling by downstream processing equipment. Otherwise, the pieces would jam the equipment and stop the process.

The upper portion of the apparatus of this invention, comprising the hopper and advancing assembly may, as a unit, be installed upon existing dough dispensing apparatus. Said upper portion in fact includes novel features, as described above, which cause said upper portion to be a separately patentable aspect of the present invention.

By virtue of the aforesaid specialized features of the apparatus of this invention, the first operating pressure of the dough entering the metering pump is held constant while minimizing shear degradation. In particular, the first and second operating pressures of the dough within the apparatus of this invention are controlled throughout a confinement region defined at its upstream extremity by the auger, and defined at its downstream extremity by tapered plug 61. The attendant constant density of the dough at the metering pump and at the nozzle produces remarkably accurate scaling of below 1% deviation from a target weight. A further consequence of the method and apparatus of this invention is the production of bakery products of improved textural uniformity. In particular, the pore or cell diameter exhibits less than 4% variation from the average diameter.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A method of moving and treating dough comprising the steps of:

a) feeding dough into an auger that pressurizes and imparts downstream impetus to the dough, b) feeding the pressurized dough into a confining region having an upstream zone which establishes a first operating dough pressure, and a downstream zone which establishes a second operating dough pressure, c) advancing the pressurized dough from said upstream zone to said downstream zone by a positive displacement metering device, and d) permitting controlled emergence of the dough from the downstream zone of said confining region.

2. The method of claim 1 further comprising the steps of sensing pressure within said confining zone, and varying a rotational speed of the auger responsive to the sensed first operational pressure to thereby control said pressure.

3. The method of claim 1 wherein a developer is interposed between the auger and metering device within said confining region.

4. The method of claim 2 wherein the first operational pressure within said upstream zone is sensed for the purpose of varying a rotational speed of the auger.

5. The method of claim 1 wherein the controlled emergence of dough from the confining region is accomplished by a device which resiliently resists passage of dough through an outlet orifice, thereby damping excursions of pressure from a sought pressure within said confining region.

6. In a method of treating and moving dough through an apparatus in which dough is provided to an auger and thence to a developer, a metering device, and a nozzle where it is dispensed, the improvement comprising the steps of:

a) pressurizing the dough with the auger, b) maintaining the dough in a pressurized state as it moves from the auger, through the developer and metering device to an inlet to the nozzle, c) controlling the extent of pressurization by varying a rotational speed of the auger, and d) damping pressure excursions of the pressurized dough by resiliently resisting passage of the dough toward the nozzle.

7. The method of claim 1 wherein said second operational pressure is between 20% and 50% lower than said first operational pressure.

8. Apparatus for treating and dispensing dough comprising:

a) an auger for pressurizing dough received at atmospheric pressure to an operating pressure above atmospheric pressure, and for simultaneously imparting a downstream impetus to the pressurized dough, b) confinement means for receiving the pressurized dough and directing downstream transport of the dough under the impetus of said auger, c) means for metering said pressurized dough within said confinement means and advancing the dough in a downstream direction, and d) outlet means for dispensing the dough from said confinement means.

9. The apparatus of claim 8 further comprising a developer disposed within said confinement means between the auger and metering means.

10. The apparatus of claim 8 further comprising a pressure sensor downstream of the auger and interactive with means for varying the rotational speed of the auger responsive to the sensed pressure, thereby controlling the pressure within said confinement means.

11. The apparatus of claim 8 wherein said outlet means includes a nozzle.

12. The apparatus of claim 11 wherein resilient means are interposed between said metering means and said nozzle for resisting downstream passage of dough toward said nozzle, thereby damping excursions of pressure within said confinement means.

13. The apparatus of claim 8 wherein said confinement means includes upstream and downstream zones.

14. The apparatus of claim 13 wherein said outlet means is interactive with said downstream zone.

15. The apparatus of claim 9 wherein said auger and said developer are coplanar and horizontally disposed in connected chambers atop said metering means.

16. A method of moving and treating dough comprising the steps of:

a) feeding dough into an auger that pressurizes and imparts a downstream impetus to the dough;

b) feeding the pressurized dough from the auger into a confining region in which pressure is controlled; and c) controlling emergence of the dough from the confining region with a pressure drop regulator which operates with the auger to control the pressure in the confining region.

17. The method of claim 16 further comprising the step of advancing the pressurized dough through the confining region with a positive displacement metering device which separates the confining region into an upstream zone at a first pressure and a downstream zone at a second pressure.

18. The method of claim 17 further comprising the step of controlling the first pressure by varying a rotational speed of the auger.

19. The method of claim 17 further comprising the step of controlling the second pressure by varying a size of an opening in the pressure regulator from which the dough emerges.

20. The method of claim 16 further comprising the step of developing the pressurized dough from the auger.

21. The method of claim 16 wherein the step of controlling emergence of the dough comprises the step of resiliently resisting emergence of the dough with the pressure regulator.

22. The method of claim 16 further comprising the steps of:

advancing the pressurized dough through the confining region with a positive displacement metering device which separates the confining region into an upstream zone at a first pressure and a downstream zone at a second pressure, controlling the first pressure by varying a rotational speed of the auger, and controlling the second pressure by varying a resilient resistance to passage of the dough through an opening in the pressure regulator from which the dough emerges.

23. In a method of treating and moving dough through an apparatus in which dough is provided to an auger and thence to a developer, a metering device, and a nozzle where it is dispensed, the improvement comprising the steps of:

(a) pressuring the dough with the auger;

(b) maintaining the pressurization of the dough as the dough moves from the auger, through the developer and metering device to an inlet to the nozzle;

(c) controlling the pressurization by varying a rotational speed of the auger; and (d) damping pressure excursions by resiliently resisting passage of the dough toward the nozzle.

24. The method of claim 23 wherein the step of maintaining pressurization comprises the step of maintaining the pressure at two levels, a first pressure level upstream of the metering device and a second pressure level downstream of the metering device.

25. The method of claim 24 wherein the step of controlling the pressurization by varying a rotational speed of the auger controls the first pressure level.

26. The method of claim 24 wherein the step of damping pressure excursions further comprises the step of controlling the second pressure level by varying the resilient resistance to passage of the dough.

27. An apparatus for moving and treating dough comprising: an auger for pressuring dough and for simultaneously imparting a downstream impetus to the pressurized dough; confining means for maintaining the pressurization of the dough while the dough from said auger moves downstream under the impetus of said auger, a positive displacement metering device in said confining means for separating said confining means into an upstream zone at a first pressure and a downstream zone at a second pressure and a pressure drop regulator for controlling emergence of the dough from said confining means, wherein said auger and said pressure drop regulator control the pressurization in said confining means.

28. The apparatus of claim 27 further comprising a pressure sensor for sensing the first pressure and means for varying a rotational speed of said auger responsive to said pressure sensor to thereby control the first pressure.

29. The apparatus of claim 27 further comprising means for varying a size of an opening in said pressure regulator from which the dough emerges to thereby control the second pressure.

30. The apparatus of claim 27 further comprising a dough developer for receiving the pressurized dough from said auger.

31. The apparatus of claim 27 wherein said pressure regulator comprises a resiliently resistive plug for controlling emergence of the dough from said confining means.

32. The apparatus of claim 31 wherein said pressure regulator further comprises a coiled spring for applying a resilient resistance to movement of said plug.

33. The apparatus of claim 27 further comprising:

a positive displacement metering device for advancing the pressurized dough through said confining means and for separating said confining means into an upstream zone at a first pressure and a downstream zone at a second pressure, means for controlling the first pressure by varying a rotational speed of said auger, and means for controlling the second pressure by varying a resilient resistance to passage of the dough through an opening in said pressure regulator from which the dough emerges.

34. In a apparatus for treating and moving dough in which dough is provided to an auger which impels the dough through a developer, a metering device, and a nozzle where it is dispensed, the improvement comprising:

pressure tight means for maintaining pressurization of the dough as the dough moves from the auger, through the developer and metering device to an inlet to the nozzle;

means for controlling the pressurization by sensing a pressure in said pressure tight means and by varying a rotational speed of the auger responsive to the sensed pressure; and a resiliently resistive plug for damping pressure excursions by resiliently resisting passage of the pressurized dough toward the nozzle.

35. The apparatus of claim 34 wherein the metering device is a positive displacement pump which maintains pressurization in said pressure tight means at two levels, a first pressure level upstream of the metering device and a second pressure level downstream of the metering device.

36. The apparatus of claim 35 wherein said means for controlling comprises a pressure sensor for sensing the first pressure.

37. The apparatus of claim 35 wherein said plug comprises means for varying the resilient resistance to passage of the dough.

* * * * *

US005731022B1

REEXAMINATION CERTIFICATE (4077th)

United States Patent [19]
Cummins

[11] B1 5,731,022
[45] Certificate Issued May 2, 2000

[54] METHOD AND APPARATUS FOR DISPENSING BAKERY DOUGH

[75] Inventor: Donald L. Cummins, deceased, late of Mechanicsville, Va., by Marian G. Cummins, executor

[73] Assignee: Cummins Eagle, Inc., Ashland, Va.

Reexamination Request:
No. 90/005,171, Nov. 30, 1998

Reexamination Certificate for:
Patent No.: 5,731,022
Issued: Mar. 24, 1998
Appl. No.: 08/644,107
Filed: May 10, 1996

Related U.S. Application Data

[63] Continuation-in-part of application No. 08/516,431, Aug. 17, 1995, Pat. No. 5,516,272, which is a continuation-in-part of application No. 08/297,123, Aug. 29, 1994, Pat. No. 5,443,854.

[51] Int. Cl.[7] .................. A21C 1/00; A21D 6/00
[52] U.S. Cl. .................. 426/231; 222/55; 222/63; 425/145; 425/149; 425/382.4; 426/516
[58] Field of Search .................. 426/231, 516; 425/149, 145, 382.4; 222/55, 63, 1, 412, 137, 185; 137/881, 883; 239/570, 571, 579

[56] References Cited

U.S. PATENT DOCUMENTS 2,401,391  6/1946  Vale et al. .................. 137/881
3,927,611  12/1975  Papalexis et al. .................. 99/472
4,960,601  10/1990  Cummins .................. 426/504
5,046,940  9/1991  Cummins .................. 425/239
5,123,830  6/1992  Papalexis .................. 425/307

OTHER PUBLICATIONS

AMF Superior Bun Divider, 4 pages, published Aug. 1989 ("SBD").

Do–Flow Stainless Steel Update Kit Feature Option 00001–100, by Union Machinery Division, AMF Incorporated, dated Feb. 20, 1985.

SBD–Do–Flow Retrofit Installation, by AMF Bakery Systems, Richmond, Virginia, dated Aug. 23, 1991, CVC No. 33531–143.

*Primary Examiner*—George C. Yeung

[57] ABSTRACT

Dough intended for use in producing bakery products is homogenized and advanced to extrusion nozzles where it is cut into successive pieces that fall onto a moving conveyor. The pieces are of precisely uniform weight because a constant pressure is maintained on the dough as it is forwarded by a metering pump toward the nozzles. Apparatus for achieving such result includes an auger, a developer positioned downstream from the auger, and a transition chamber fed by the developer and located upstream from the metering pump. A pressure-measuring monitor serves to control the rotational speed of the auger, thereby maintaining the dough under constant pressure within the apparatus.

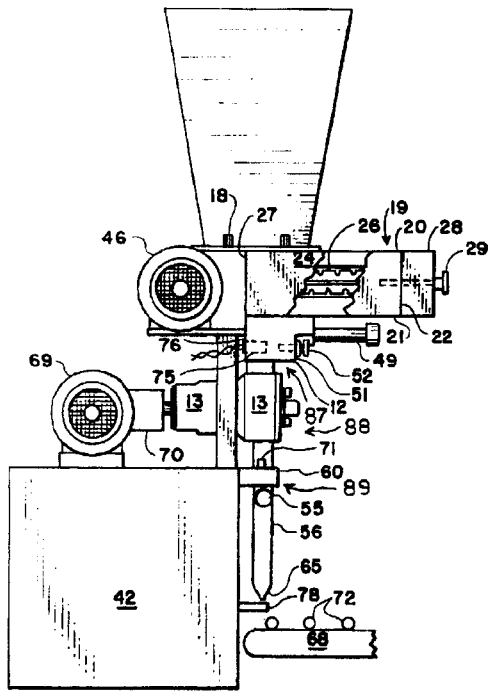

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 23–26 and 34–37 is confirmed.

Claims 1, 8, 16 and 27 are cancelled.

Claims 2–5, 7, 9–11, 13, 17, 20–22, 28–31 and 33 are determined to be patentable as amended.

Claims 12, 14, 15, 18, 19 and 32, dependent on an amended claim, are determined to be patentable.

New claims 38–43 are added and determined to be patentable.

2. The method of claim [1] *3* further comprising the steps of sensing pressure within said confining zone, and varying a rotational speed of the auger responsive to the sensed first operational pressure to thereby control said pressure.

3. [The method of claim 1 wherein] *A method of moving and treating dough comprising the steps of:*
   *a) feeding dough into an auger that pressurizes and imparts downstream impetus to the dough,*
   *b) feeding the pressurized dough into a confining region having an upstream zone which establishes a first operating dough pressure, and a downstream zone which establishes a second operating dough pressure,*
   *c) advancing the pressurized dough from said upstream zone to said downstream zone by a positive displacement metering device,*
   *d) permitting controlled emergence of the dough from the downstream zone of said confining region, and*
   *e) interposing* a developer [is interposed] between the auger and metering device within said confining region.

4. The method of claim [2] *3* wherein the first operational pressure within said upstream zone is sensed for the purpose of varying a rotational speed of the auger responsively to the sensed first operational pressure.

5. The method of claim [1] *3* wherein the controlled emergence of dough from the confining region is accomplished by a device which resiliently resists passage of dough through an outlet orifice, thereby dampening excursions of pressure from a sought pressure within said confining region.

7. The method of claim [1] *3* wherein said second operational pressure is between 20% and 50% lower than said first operational pressure.

9. [The apparatus of claim 8 further comprising] *Apparatus for treating and dispensing dough comprising:*
   *a) an auger for pressurizing dough received at atmospheric pressure to an operating pressure above atmospheric pressure, and for simultaneously imparting a downstream impetus to the pressurized dough,*
   *b) confinement means for receiving the pressurized dough and directing downstream transport of the dough under the impetus of said auger,*
   *c) means for metering said pressurized dough within said confinement means and advancing the dough in a downstream direction,*
   *d) outlet means for dispensing the dough from said confinement means, and*
   *e)* a developer disposed within said confinement means between the auger and metering means.

10. The apparatus of claim [8] *9* further comprising a pressure sensor downstream of the auger and interactive with means for varying the rotational speed of the auger responsive to the sensed pressure, thereby controlling the pressure within said confinement means.

11. The apparatus of claim [8] *9* wherein said outlet means includes a nozzle.

13. The apparatus of claim [8] *9* wherein said confinement means includes upstream and downstream zones.

17. The method of claim [16] *20* further comprising the step of advancing the pressurized dough through the confining region with a positive displacement metering device which separates the confining region into an upstream zone at a first pressure and a downstream zone at a second pressure.

20. [The method of claim 16 further comprising the step of] *A method of moving and treating dough comprising the steps of:*
   *a) feeding dough into an auger that pressurizes and imparts a downstream impetus to the dough;*
   *b) feeding the pressurized dough from the auger into a confining region in which pressure is controlled;*
   *c) controlling the emergence of the dough from the confining region with a pressure drop regulator which operates with the auger to control the pressure in the confining region; and*
   *d) developing the pressurized dough from the auger.*

21. The method of claim [16] *20* wherein the step of controlling emergence of the dough comprises the step of resiliently resisting emergence of the dough with the pressure regulator.

22. The method of claim [16] *20* further comprising the steps of:
   advancing the pressurized dough through the confining region with a positive displacement metering device which separates the confining region into an upstream zone at a first pressure and a downstream zone at a second pressure,
   controlling the first pressure by varying a rotational speed of the auger, and
   controlling the second pressure by varying a resilient resistance to the passage of the dough through an opening in the pressure regulator from which the dough emerges.

28. The apparatus of claim [27] *30* further comprising a pressure sensor for sensing the first pressure and means for varying a rotational speed of said auger responsive to said pressure sensor to thereby control the first pressure.

29. The apparatus of claim [27] *30* further comprising means for varying a size of an opening in said pressure regulator from which the dough emerges to thereby control the second pressure.

30. *An apparatus for moving and treating dough comprising: an auger for pressurizing dough and for simultaneously imparting a downstream impetus to the pressurized* dough; confining means for maintaining the pressurization of the dough while the dough from said auger moves downstream under the impetus of said auger, a positive displacement metering device in said confining means for separating said confining means into an upstream zone at a first pressure and a downstream zone at a second pressure and a pressure drop regulator for controlling emergence of the dough from said confining means, wherein said auger and said pressure drop regulator control the pressurization in said confining means, [The apparatus of claim 27 further comprising] *including* a dough developer for receiving the pressured dough from said auger.

31. The apparatus of claim [27] *30* wherein said pressure regulator comprises a resiliently resistive plug for controlling emergence of the dough from said confining means.

33. The apparatus of claim [27] *30* further comprising:

a positive displacement metering device for advancing the pressured dough through said confining means and for separating said confining means into an upstream zone at a first pressure and a downstream zone at a second pressure, means for controlling the first pressure by varying a rotational speed of said auger, and means for controlling the second pressure by varying a resilient resistance to passage of the dough through an opening in said pressure regulator form which the dough emerges.

*38. The apparatus of claim 30 further including means for dividing the dough into uniform pieces each having a diameter varying less than approximately 4% from the average diameter of the dough pieces.*

*39. The apparatus of claim 30 further including means for dividing the dough into pieces having a weight deviating less than approximately 2% from a selectable target weight.*

*40. The apparatus of claim 30 further including means for maintaining the pressure in said upstream zone in the range of 15–28 psig.*

*41. The method of claim 3 further comprising the step of dividing the dough into uniform pieces each having a diameter varying less than approximately 4% from the average diameter of the dough pieces.*

*42. The method of claim 3 further comprising the step of dividing the dough into pieces having a weight deviating less than approximately 2% from a selectable target weight.*

*43. The method of claim 3 further comprising the step of maintaining the pressure in said upstream zone in the range of 15–28 psig.*

\* \* \* \* \*